United States Patent [19]
Kajitani et al.

[11] Patent Number: 4,834,516
[45] Date of Patent: May 30, 1989

[54] NONINVERTING PHOTO-MICROSCOPE WITH VARIABLE POWER LENSES

[75] Inventors: Kazuo Kajitani, Ina; Chikara Nagano, Hachiouji; Makoto Shigehara, Hachiouji; Kazuhiko Osa, Hachiouji; Eisuke Arinobe; Hideto Yamashita, both of Ina, all of Japan

[73] Assignee: Olympus Optical Co., Ltd., Tokyo, Japan

[21] Appl. No.: 127,770

[22] Filed: Dec. 1, 1987

[30] Foreign Application Priority Data

Dec. 1, 1986 [JP] Japan .................. 61-286276
Dec. 2, 1986 [JP] Japan .................. 61-287226
Dec. 3, 1986 [JP] Japan .................. 61-288269

[51] Int. Cl.[4] .............................. G02B 21/36
[52] U.S. Cl. .................. 350/502; 350/508; 350/511; 350/519; 350/520
[58] Field of Search ........ 350/502, 508, 511, 519-520, 350/573

[56] References Cited

U.S. PATENT DOCUMENTS 3,437,395  4/1969  Rosenberger et al. ............ 350/511
3,549,230 12/1970  Kato et al. ...................... 350/519
4,527,869  7/1985  Nihoshi .......................... 350/502
4,567,478  1/1986  Schwab .......................... 350/502
4,572,624  2/1986  Schindl .......................... 350/502
4,723,842  2/1988  Twisselmann et al. ............ 350/511

FOREIGN PATENT DOCUMENTS 3225353  10/1983  Fed. Rep. of Germany .
51-84539   7/1976  Japan .
51-141624 12/1976  Japan .
57-171302 10/1982  Japan .
59-17521   1/1984  Japan .

Primary Examiner—John K. Corbin
Assistant Examiner—Martin Lerner
Attorney, Agent, or Firm—Cushman, Darby & Cushman

[57] ABSTRACT

A microscope apparatus manufacturable at a low cost, and equipped with a photographing device assuring coincidence between an image to be observed and an image to be photographed, correctly photographing the up-down and right-left directions of a sample with no switching operation and permitting correct readout of characters, etc. written on a sample, a macro observation or drawing attachment permitting observation of the entire surface of a sample even of a large size without fail, not degrading operability of the microscope and having a composition to facilitate correction of image rotation, and a data imprinting device providing legible imprinted data images and capable of shifting data imprinting position on the film surface of the photographing device.

9 Claims, 6 Drawing Sheets

FIG. 4

| IMAGE PLANE | |
|---|---|
| A₀ | F |
| A₁ | F |
| A₂ | ⊣ |
| A₃ | F |
| A₂' | ⊣ |
| A₂" | ⊣ |

FIG. 5

| POSTURE / IMAGE PLANE | (1) | (2) | (3) | (4) | (5) |
|---|---|---|---|---|---|
| B₀ | F | F | F | F | F |
| B₁ | ⊢ | ∨ | ⊥ | ⋟ | ⊣ |
| B₂ | ⊢ | ⊢ | ⊢ | ⊢ | ⊢ |
| A₁ | F | F | F | F | F |
| A₂ | ⊣ | ⊣ | ⊣ | ⊣ | ⊣ |
| A₃ | F | F | F | F | F |
| A₂' | ⊣ | ⊣ | ⊣ | ⊣ | ⊣ |
| A₂" | ⊣ | ⊣ | ⊣ | ⊣ | ⊣ |

NONINVERTING PHOTO-MICROSCOPE WITH VARIABLE POWER LENSES

BACKGROUND OF THE INVENTION (a) Field of the Invention

The present invention relates to a microscope apparatus, and more particularly to a microscope equipped with a sample macro observation or drawing attachment and a data imprinting device.

(b) Description of the Prior Art

The conventional microscope, for example, the microscope disclosed by Japanese Patent Preliminary Publication No. Sho 57-171302 comprises (1) a system for magnifying and projecting to a film surface a primary image formed by an objective lens and magnified by a variable power optical system, (2) a system for forming a secondary image by relaying said primary image and (3) a system for projecting said relayed secondary image as a ternary image again to the focal plane of the eyepiece lens, and is so formed as to arrange a scale, etc. at the first image position and a photo mask, etc. at the secondary image position. However, the microscope has drawbacks that it requires an image rotating prism and high manufacturing cost since the plane including the relay optical system is perpendicular to the optical axis of the objective lens. Further, the microscope is provided additionally with an optical system which permits observation of the primary image formed by the objective lens through the eyepiece lens for focusing and confirming photographing range at a stage of photographing, and is switchable, as occasion demands, with the optical system for observing the ternary image through the eyepiece lens. However, the microscope has problems that a photographed image deviates from the confirmed image since the image confirmed through the eyepiece lens is not photographed directly, and the microscope requires tedious procedures for switching said optical systems. Furthermore, the microscope has another shortcoming that at least one of the image observed through the eyepiece lens and the image formed on a photographing film or screen is a mirror image (image formed after reflections in an odd number of times), and the up-down or right-left direction of a sample is incorrectly photographed and characters on a sample cannot be read correctly.

Moreover, the macro observation or drawing attachment for the conventional microscope, for example, the attachment disclosed by Japanese Patent Preliminary Publication No. Sho 59-17521, is designed for use with a microscope having a fixed objective lens tube, and has a drawback that the microscope base body hinders the center of a large sample from being aligned with the objective lens when a sample to be subjected to the macro observation is large, thereby making it impossible to observe center of such a large sample. In addition, the conventional macro observation or drawing attachment has a problem that a large sample is hardly settable since the objective lens tube is located above the sample mounting stage. Further, the microscope has another shortcoming that its base has low operability due to the fact that the microscope base is located close to the objective lens tube. Furthermore, an image rotator is used for correcting image rotation in the optical system of the microscope, thereby complicating the composition and increasing manufacturing cost of the microscope.

Moreover, the conventional data imprinting device, for example, the one disclosed by Japanese Patent Preliminary Publication No. Sho 51-141624, is incapable of shifting an image on the film surface as occasion demands and inconvenient for practical use.

SUMMARY OF THE INVENTION

A primary object of the present invention is to provide a microscope apparatus equipped with a photographing device manufacturable at a low cost, capable of making an image observed through the eyepiece lens at the photographing stage securely coincident with an image to be photographed, photographing up-down and right-left directions correctly with no switching operation, and providing characters, etc. written on a sample which are not mirror images and correctly read.

Another object of the present invention is to provide a microscope apparatus equipped with a macro observation or drawing attachment permitting observation of the entire surface of a sample without fail even of a large size, facilitated sample setting without degrading operability of the microscope proper, and easily correcting rotation of sample without complicating the composition of the microscope.

A third object of the present invention is to provide a microscope apparatus equipped with a data imprinting device capable of providing data images to be imprinted in legible forms and shifting data imprinting location on the film surface.

According to the present invention, these objects can be accomplished by projecting the primary image plane of the objective lens system to the secondary image plane through a variable power relay system, splitting the optical path into a photographing optical path and observation optical path on the image side of said variable power relay system, and arranging said variable power relay system on a plane including the optical axis of the objective lens system so that an image of object is reflected in an even number of times. This formation makes it unnecessary to use the image rotating prism for correcting image position, and form an image on the film surface and an image observed through the eyepiece lens as orthographic images which are the same as those seen by the naked eyes.

The macro observation or drawing device according to the present invention is equipped with a first deflection section for deflecting the perpendicular optical axis passing through the objective lens to the horizontal direction, a second deflection section for deflecting said horizontal optical axis again to the perpendicular direction, and a third deflection section for deflecting said perpendicular optical axis deflected by the second deflection section again to the horizontal direction and leading an image of a horizontally set object into the objective lens system of the microscope, said first and second deflection sections having an odd number of reflecting surfaces in total, said first and third deflection sections having reflecting surfaces in such a number as to be an even number when totalized with all the reflecting surfaces arranged in the optical system of the microscope, and the microscope tube including the objective lens, first deflection section and second deflection section is so composed as to be rotatable around the perpendicular optical axis between the second deflection section and the third deflection section.

Further, the data imprinting device according to the present invention is equipped with a data light source, a deflection member for deflecting data images from the data light source, a projecting optical system and a data inserting prism for inserting the data images into the vicinity of the image plane in the optical path of the microscope.

These and other objects as well as the features and advantages of the present invention will be apparent from the following detailed description of the preferred embodiments when taken in conjunction with the accompanying drawings.

BRIEF DESCRIPTION OF THE DRAWINGS

FIGS. 4 and 5 are diagrams illustrating image conditions in the microscope apparatus according to the present invention;

DESCRIPTION OF THE PREFERRED EMBODIMENTS

Now, referring to FIGS. 1 through 7, an embodiment of the microscope apparatus according to the present invention will be described in details.

Figure 1:
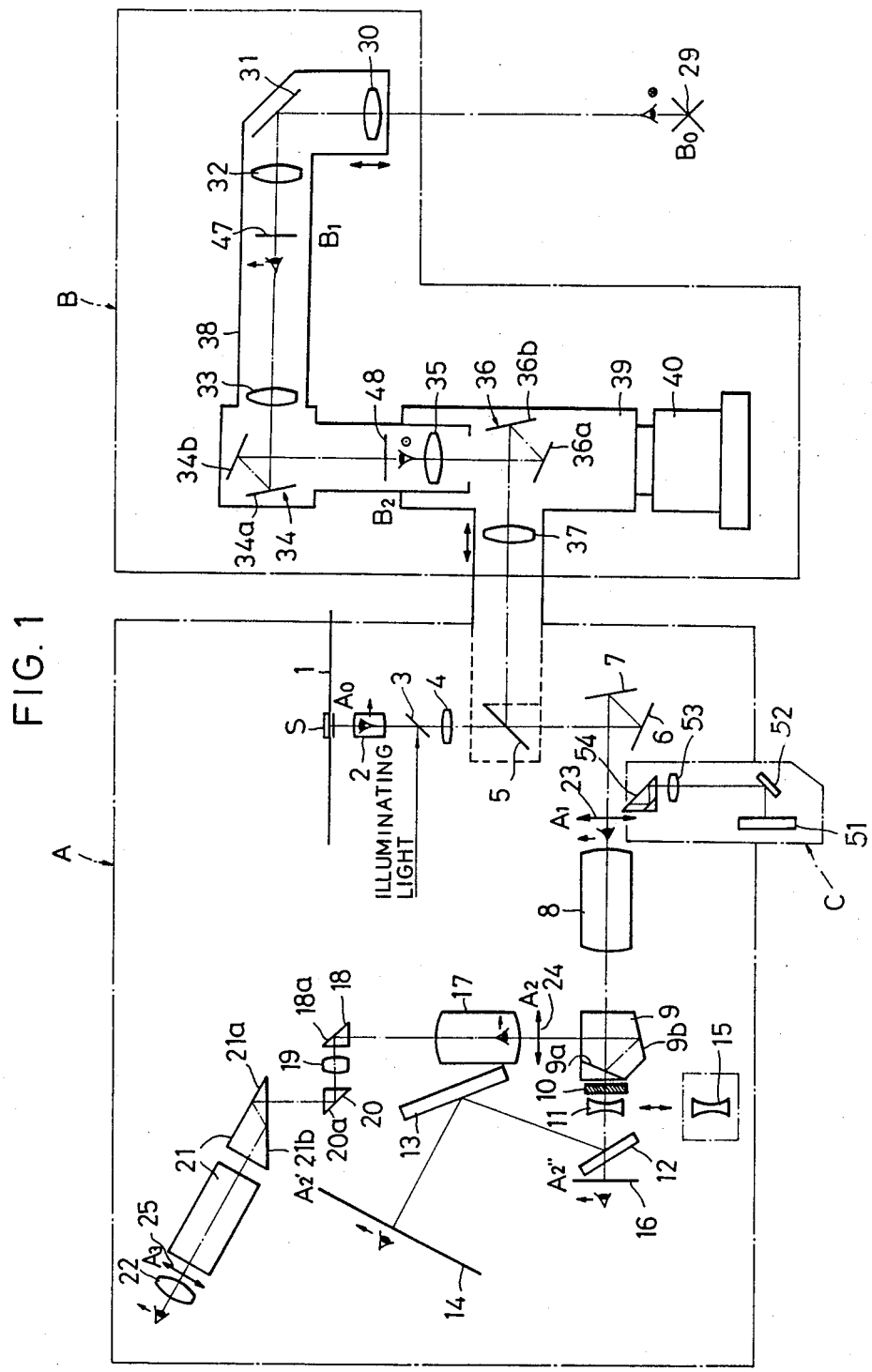
FIG. 1 is a sectional view illustrating the overall composition of an embodiment of the microscope apparatus according to the present invention.

Shown in FIG. 1 is the main unit of the microscope in the chain line enclosure A wherein the reference numeral 1 represents a stage for mounting a sample S, the reference numeral 2 designates an objective lens, the reference numeral 3 denotes a beam splitter, the reference numeral 4 represents an imaging lens, the reference numeral 5 designates a deflection member consisting of a mirror or half mirror as described later, the reference numerals 6 and 7 denote mirrors, the reference numeral 8 represents a zoom relay lens, the reference numeral 9 designates a half mirror prism, the reference numeral 10 denotes a shutter, the reference numeral 11 represents a concave lens, the reference numerals 12 and 13 designate mirrors, the reference numeral 14 denotes a large size film surface, the reference numeral 15 represents a concave lens replaceable with the block including the concave lens 11 and mirror 12, the reference numeral 16 designates a 35 mm film surface, the reference numeral 17 denotes a relay lens, the reference numeral 18 represents a prism, the reference numeral 19 designates a relay lens, the reference numeral 20 denotes a prism and the reference numeral 22 represents an eyepiece lens.

When illumination light is incident on the beam splitter 3 from the side as illustrated in the optical system of the microscope described above, the incident illumination light is directed upward by the beam splitter 3, passes along the optical axis of the objective lens 2 and irradiates the bottom surface of a sample S through the stage 1. The light emitted from the bottom surface of the sample S by this illumination passes through the objective lens system consisting of the objective lens 2 and the imaging lens 4 and, if the deflection member 5 is located outside the optical path as shown in the dashed line, directed to the horizontal direction by the mirrors 6 and 7, thereafter being focused as a primary image $A_1$ on the primary image plane 23. Successively, the light emitted from the primary image $A_1$ passes through the zoom relay lens 8, whereafter portion of the light is branched upward by the half mirror prism and focused as a power-varied secondary image $A_2$ on the secondary image plane 24, whereas the other portion of the light passes through the concave lens 11 and, when the shutter 10 is opened, is focused as an enlarged secondary image $A_2'$ on the large size film surface 14 after reflections on the mirrors 12 and 13 or, when the unit including the concave lens 11 and mirror 12 is replaced with the concave lens 15, is focused as a suitably power-varied secondary image $A_2''$ on the 35 mm film surface 16. Further, the light emitted from the secondary image $A_2$ passes through the relay lens 17, is directed to the horizontal direction by the prism 18 and focused as a ternary image $A_3$ on the ternary image plane 25 by the relay lens 19, prism 20 and prism 21, said ternary image $A_3$ being observable through the eyepiece lens 22. In addition, the zoom relay lens 8 and relay lens 19 are so arranged as to have optical axes located on the plane including the optical axis of the objective lens system. Accordingly, the microscope according to the present invention requires no image rotating prism for correcting image position and can be manufactured at a lower cost. Further, at the stage of photographing, the microscope permits photographing the image observed through the eyepiece pens 22 directly on the large size film surface 14 or 35 mm film surface 16, thereby making the observed image coincident with the photographed image without fail and requires no tedious switching operation. Moreover, both the image photographed on the film and the image observed through the eyepiece lens are correct orthographic image since the reflecting surfaces arranged in the section from the objective lens 2 to the photographing film 14 (16) are two on the mirrors 6 and 7, and eight reflecting surfaces of 6, 7, 9a, 9b, 18a, 20a, 21a and 21b are arranged in the section from the objective lens 2 to the eyepiece lens 22, i.e., the image is reflected in an even number of times in both of the optical paths. Therefore, the microscope is capable of photographing the up-down and right-left directions of the sample correctly, thereby permitting correct readout of characters written on the sample.

Figure 2:
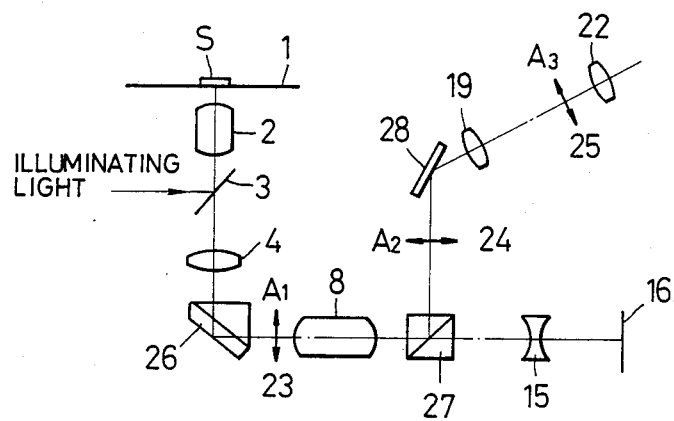
FIG. 2 is a partial sectional view illustrating a modification of the optical system of the microscope.

FIG. 2 shows another example of the optical system in the main unit A of the above described microscope. In this example, a roof prism 26 is arranged in place of the mirrors 6 and 7, a beam splitter 27 is used in place of the half mirror prism 9, and a mirror 28 is employed in place of the prisms 18, 19 and 20. In addition, the concave mirror 15 is fixed, and mirrors 12 and 13 as well as the large film surface 14 are omitted to reduce the number of component parts remarkably.

Figure 6:
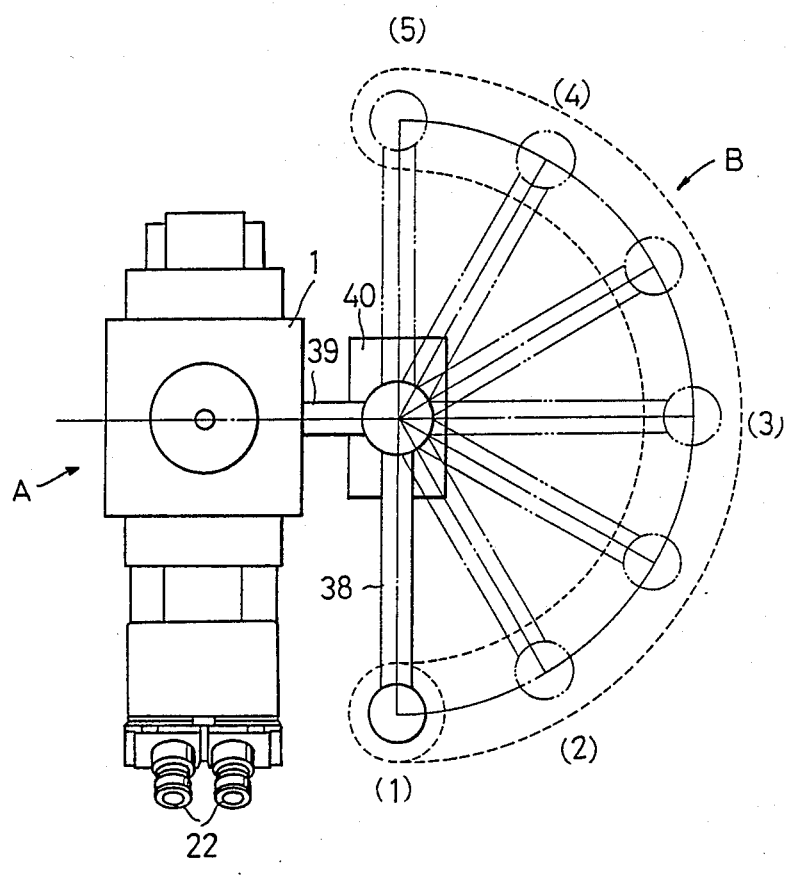
FIGS. 6 and 7 are plan views illustrating shift positions and excluded conditions of the tube of the macro observation or drawing attachment.
Figure 7:
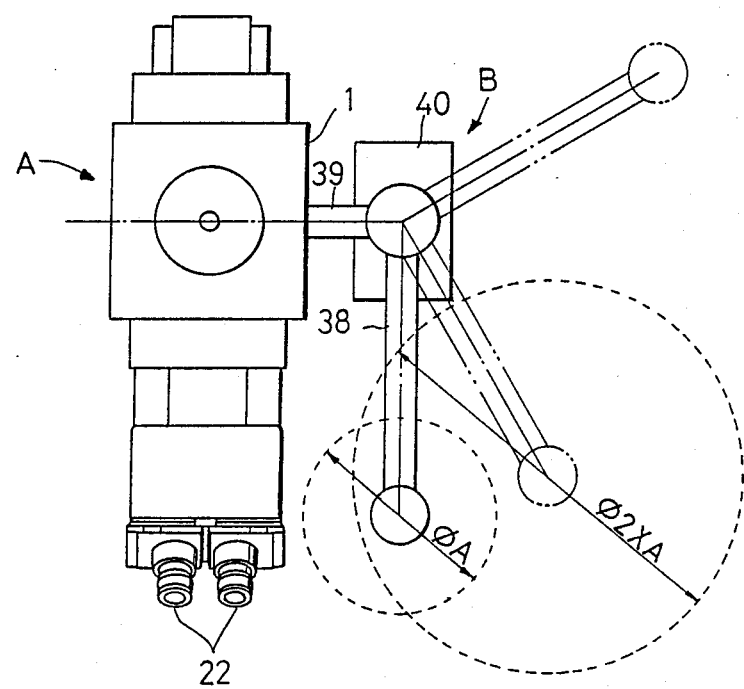

The chain line enclosure B in FIG. 1 indicates the section of a macro observation or drawing attachment in the form of a developed drawing, and the section B is actually located in the direction perpendicular to the paper surface as shown in FIGS. 6 and 7, wherein the reference numeral 29 represents a sample or an object such as a drawing surface placed horizontally at a position other than that of the sample S, the reference numeral 30 designates an objective lens, the reference numeral 31 denotes a first deflection section consisting of a mirror for deflecting the optical axis of the objective lens 30 from the perpendicular direction to the horizontal direction, the reference numeral 32 represents an imaging lens, the reference numeral 33 designates a relay lens, the reference numeral 34 denotes a second deflection section consisting of two mirrors 34a and 34b for deflecting the horizontally deflected optical axis of the objective lens 30 again to the perpendicular direction, the reference numeral 35 represents a relay lens, the reference numeral 36 designates a third deflection section consisting of two mirrors 36a and 36b for deflecting the optical axis of the objective lens 30 perpendicularly deflected by the second deflection section further to the horizontal direction and the reference numeral 37 denotes a relay lens. Said deflection member 5 is removably arranged between the imaging lens 4 and mirror 6 in the optical system A of the microscope, and used for aligning the optical axis of the relay lens 37 with that of the imaging lens 4, i.e., actually to deflect the optical path of the relay lens sideways. The reference numeral 38 represents a first tube for mounting the objective lens 30, the first deflection section 31, imaging lens 32, the relay lens 33, the second deflection section 34 and the relay lens 35, the reference numeral 39 designates a second tube for mounting the third deflection section 36 and the relay lens 37, and the reference numeral 40 denotes a mounting base, said first tube 38 being mounted on the second tube 39 so as to be rotatable around the optical axis of the relay lens 35 and said second tube being mounted on the mounting base 40 in such a manner that the perpendicular position of the former is adjustable. Further, the objective lens 30 is displaceable along the optical axis for varying magnification and the relay lens 37 is shiftable along the optical axis for focusing.

Figure 3:
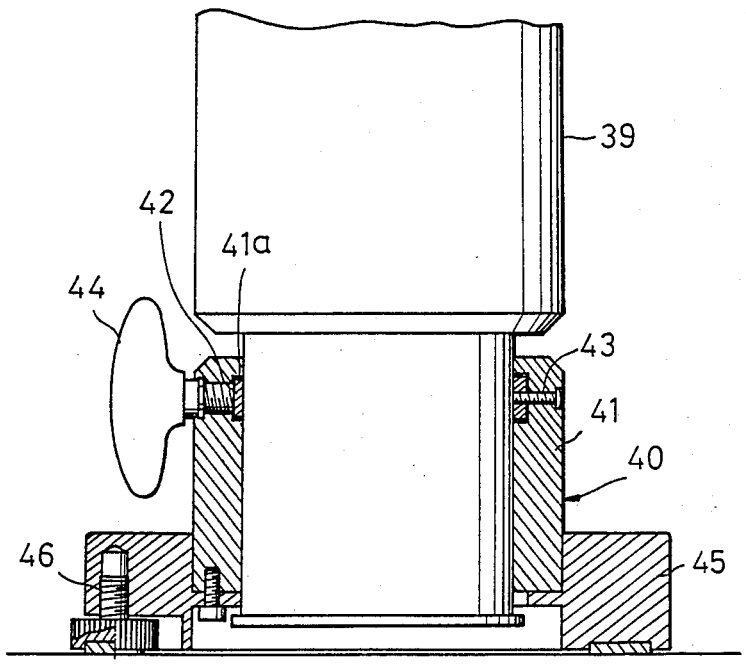
FIG. 3 is a sectional view illustrating the mounting base of the embodiment shown in FIG. 1.

In FIG. 3, the reference numeral 41 represents a tube axially (in the perpendicular direction) slidably fitted over the smaller-diameter section of the second tube 39, the reference numeral 42 designates a semi-circular ring embedded into the ring-shaped groove 41a in the inner circumference of the tube 41 and having an end fixed to the tube 41 with a setscrew 43, the reference numeral 44 denotes a fixing screw screwed into the tube 41 and to be tightened for bringing the ring 42 into contact under pressure with the smaller-diameter section of the second tube 39 to fix the second tube 39 to the tube 41 at a suitable position, and the reference numeral 45 represents a base fitted into the lower portion of the tube 41 and having an adjuster screw 46 screwed at a suitable location into the bottom of the base; inclination of said base relative to the horizontal plane being adjustable by varying the screwed degree of the adjuster screw 46.

In the macro observation or drawing attachment described above, the light emitted from the top surface of the object 29 is focused to form an image 47 on the image plane $B_1$ by the objective lens 30, the first deflection section 31 and the imaging lens 32. The light emitted from the image 47 is deflected from the horizontal direction to the perpendicular direction by the relay lens 33 and the second deflection section 34, thereafter being focused as an image 48 on the image plane $B_2$. The light emitted from the image 48 is deflected from the perpendicular direction to the horizontal direction by the relay lens 35 and the third deflection section 36, thereafter being focused as an image similar to the image 23 on the image plane $A_1$ by the deflection section 5, mirrors 6 and 7 inserted in optical paths of the relay lens 37 and imaging lens 4. As apparent from the foregoing descriptions, when the deflection section 5 is not inserted into the optical path of the imaging lens 4, i.e., when the macro observation or drawing attachment is not employed, an arrow marked on the plane $A_0$ (the bottom surface of the sample S) is directed as shown in FIG. 1 on the image planes $A_1$, $A_2$, $A_2'$ $A_2''$, and $A_3$ respectively, and an erect image is observed through the eyepiece lens 22. In other words, if a character of F is written on the surface $A_0$ with its top set in the direction indicated by the arrow, the images of F on the image planes as seen from the positions shown in FIG. 1 are as listed in FIG. 4. When the macro observation or drawing attachment is set to the main unit A of the microscope, the deflection section 5 is inserted into the optical path of the imaging lens 4, fourteen reflecting surfaces, i.e., 31, 34a, 34b, 36a, 36b, 5, 6, 7, 9a, 9b, 18a, 20a, 21a and 21b, exist between the object 29 and the eyepiece lens 22, and the image is rotated by the five image planes of $B_1$, $B_2$, $A_1$, $A_2$ and $A_3$ as well as the deflection sections 5 and 6 (36b, 5, 6, 7) in the mode similar to the image rotation by use of a porro prism, i.e., the image rotation is performed in an even number of times, whereby an orthographic images is observed by the microscopist on the front side (on the side closer to the prism 21) of the eyepiece lens 22 as shown in FIG. 5 where the arrow on the surface $B_0$ indicates the top. Further, the eight reflecting surfaces of 31, 34a, 34b, 36a, 36b, 5, 6 and 7, i.e., an even number of reflecting surfaces exist between the object 29 and film surface 16 or imaging surface $A_2''$, and the image is rotated in an odd number of times by the five imaging surfaces of $B_1$, $B_2$, $A_1$, $A_2'$ and $A_2''$ and two deflection sections 5 and 6, whereby an inverted image is formed on the film surface 16 as seen from the rear of the film surface 16 where the arrow on the surface $B_0$ indicates the top. Further, since the optical system accommodated in the first tube 38 has three reflecting surfaces of 31, 34a and 34b, i.e., performs mirror image actions in an odd number, an image formed on the image plane $B_2$ is, as seen from the top of FIG. 1, in the same direction as that of the object 29 as shown in FIG. 5, and these images are kept in the same direction even when the first tube 38 rotates on the horizontal plane. In addition, the images of F is sketched in FIG. 5 on assumptions that each of the image planes plane is seen in the direction opposite to the advancing direction of the light, that the arrows direct the tops, and that the statuses (1) through (5) correspond to the rotational positions of the first tube 38 respectively shown in FIG. 6. Though the image plane $B_2$ is located in the first tube 38 in this example, it may be located, needless to say, in the second tube 39. Further, when the deflection section 5 consists of a half mirror, the image formed on the bottom surface of the sample S mounted on the stage 1 is overlapped with the image of the object 29, thereby making it possible to use the optical system as a drawing attachment. The deflection section 5 may be arranged in the second tube 38 and so composed as to be inserted into the optical path of the imaging lens 4 when the attachment is set to the main unit A of the microscope.

Since the first tube 38 is rotatable on the horizontal plane as described above, it is possible to align the objective lens 30 with the center of a sample as shown in FIG. 7 even when the sample has a large size and observe the entire range of the sample. Furthermore, when the sample 29 is to be set as shown in FIG. 7, the first tube 38 can be excluded to a non-hindrant position to facilitate to set a sample of large size. Moreover, operability of the microscope is not degraded owing to the fact that the first tube 38 can be kept apart from the operation section of the microscope at the operating step of the microscope base. Since rotation of images is corrected by use of mirrors only, the microscope has a simple composition and is manufacturable at a low cost.

Figure 8:
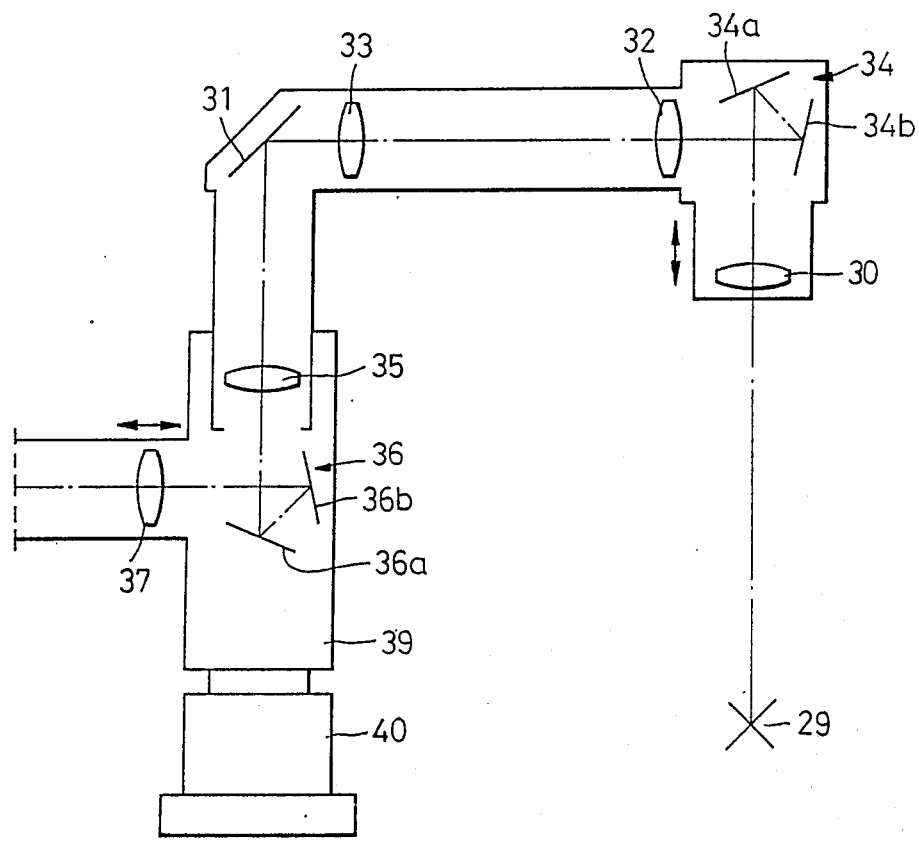
FIG. 8 is a sectional view illustrating a modification of the macro observation or drawing attachment.

FIG. 8 illustrates a modification of the microscope apparatus according to the present invention which is equivalent to the above described embodiment wherein the positions of the first deflection section 31 and the second deflection section 34 are replaced with each other.

The chain line enclosure C shown in FIG. 1 indicates a data imprinting device wherein the reference numeral 51 represents a data light source composed of electrical elements such as LEDs and LCDs, the reference numeral 52 designates a mirror for deflecting the light emitted from the data light source 51, the reference numeral 53 denotes a projector lens, and the reference numeral 54 represents a data inserting prism for inserting necessary data into the optical path between the mirror 7 and the relay lens 8 in the optical system A of the microscope. The data imprinting device is removably attached to the main unit A of the microscope, and the data inserting prism 54 is arranged in the vicinity of the image plane $A_1$ and rotatable around the optical axis of the relay lens 8 so as to partially shield said optical path with the tip of the prism 54. Therefore, a data image provided from the data light source 51 is deflected by the mirror 52, transmitted through the projector lens 53, reflected by the data inserting prism 54, led from the tip of the data inserting prism 54 into the observation and photographing optical paths in the main unit A of the microscope, and observed together with the above described sample image through the eyepiece lens 22, or imprinted on the large size camera film 14 or 35 mm camera film 16. Since the data imprinting device C is removable from the main unit A of the microscope and rotatable as described above, the microscope allows the imprinting position of data image to be changed as occasion demands so as to be clearly imprinted at a legible location within the visual field or a photograph.

In the embodiments described above, the compositions and arrangement of the optical elements can be changed or modified in various ways, for example, the half mirror prism 9 can be composed of a mirror and a half mirror.

When a prism is inserted in the vicinity of the primary image plane $A_1$, the image is masked to provide a dark (back) image readable clearly.

What is claimed is:

1. A microscope apparatus comprising a first objective lens system including an objective lens, a variable power relay system for projecting the primary image plane of said objective lens system which is provided in the rear of at least two of a plurality of reflecting surfaces to the secondary image plane of said objective lens system which is provided in the rear of at least two of an even number of reflecting surfaces, said variable power relay system being arranged on a plane including the optical axis of said objective lens system, a beam splitter means, provided in the rear of said variable power relay system, for splitting light having passed through said variable power relay system into a photographing optical path and an observation optical path through an eyepiece, a photographing optical system for projecting one of the beams split by said beam splitter means to a film surface to form a secondary image, and an observation optical system for leading the other of the beams split by said beam splitter means to an eyepiece lens to permit observation of the secondary image.

2. A microscope apparatus according to claim 1 wherein said photographing optical system comprises a variable power lens means for magnifying and projecting the secondary image to a photographic film surface.

3. A microscope apparatus according to claim 2 wherein said variable power lens comprises a first variable power lens and a second variable power lens including a mirror replaceable with each other, and either one of a 35 mm film surface or a large size film surface is selectable as a surface for photographing the secondary image.

4. A microscope apparatus according to claim 1 wherein said observation optical system comprises a relay optical system for projecting said secondary image plane to a ternary image plane to permit observation of the ternary image through the eyepiece lens.

5. A microscope apparatus according to claim 1 wherein a plural number of reflecting surfaces are comprised in said objective lens system, the photographing optical system and the observation optical system to reflect an image of a sample in an even number of times in the sections from said objective lens to said photographing film surface and to the eyepiece lens.

6. A microscope apparatus according to claim 1 further comprising a macro observation or drawing optical system capable of forming an image of a horizontally set object on said primary image plane, said macro observation or drawing optical attachment comprising a first deflection section for deflecting the perpendicular optical axis to a horizontal direction passing through a second objective lens system for forming the image of said object, a second deflection section for deflecting said horizontal optical axis to the perpendicular direction and a third deflection section for deflecting the perpendicular optical axis deflected by said second deflection section further to the horizontal direction and leading the light into a deflection section in said first objective lens system, said first and second deflection sections having an odd number of reflecting surfaces in total, said first through third deflection section having an odd number of reflecting surfaces as a total with the reflecting surfaces existing in the section from said deflection section in said first objective lens system to said eyepiece lens, and a tube comprising said second objective lens system, said first and second deflection sections being rotatable around the perpendicular optical axis between said second and third deflection sections.

7. A microscope apparatus according to claim 6 wherein the deflection sections in said first objective lens system consist of mirrors or prisms freely settable and removable into and out of said first objective lens system.

8. A microscope apparatus according to claim 6 wherein said deflection sections in said first objective lens system consist of half mirrors or half mirror prisms freely settable and removable into and out of said first objective lens system.

9. A microscope apparatus according to claim 1 further comprising a data imprinting device including a data light source, a deflection member for deflecting data image provided from said data light source, a projecting optical system and a data inserting prism, said data inserting prism being located in the vicinity of said primary image plane and said data imprinting device being arranged freely rotatably around the optical axis passing through said primary image plane.

* * * * *